Figure 1:
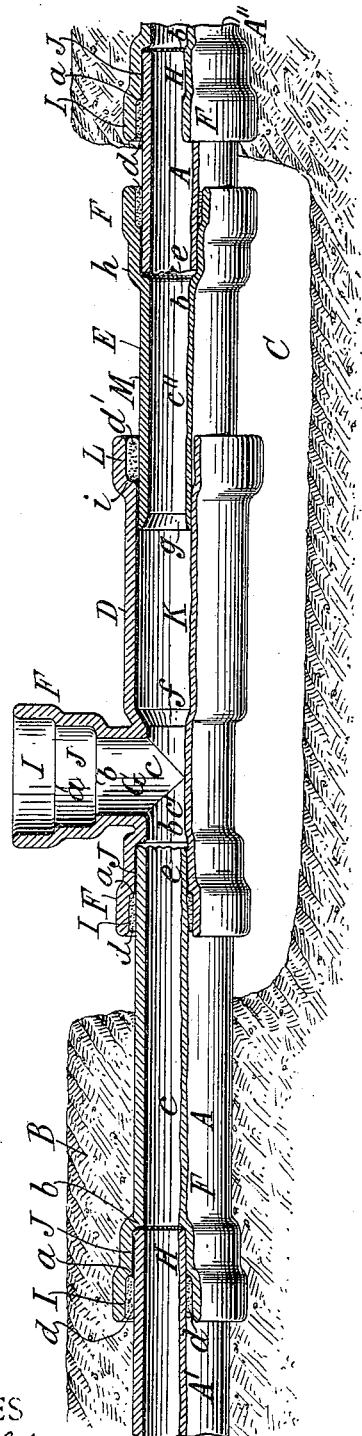

No. 666,316. Patented Jan. 22, 1901.
W. KENNEALLY.
PIPE AND PIPE JOINT.
(Application filed Feb. 1, 1899.)
(No Model.)

WITNESSES
Fred White
Thomas F. Wallace

INVENTOR:
William Kenneally,
By his Attorneys,

UNITED STATES PATENT OFFICE.

WILLIAM KENNEALLY, OF NEW YORK, N. Y.

PIPE AND PIPE-JOINT.

SPECIFICATION forming part of Letters Patent No. 666,316, dated January 22, 1901.

Application filed February 1, 1899. Serial No. 704,209. (No model.)

*To all whom it may concern:*

Be it known that I, WILLIAM KENNEALLY, formerly residing in Chicago, Cook county, Illinois, but now a resident of the city, county, and State of New York, have invented certain new and useful Improvements in Pipes and Pipe-Joints, of which the following is a pspecification.

This invention relates to pipes and pipe-joints generally, and is especially applicable to such pipes as water and gas pipes, which are buried in the earth, and to such joints as are occasionally to be formed in such pipes for connecting a branch pipe or for other purposes after the main pipe has been laid and buried.

Heretofore it has been common to make pipes for water and gas mains of cast-iron or other suitable material, forming them with a female or shouldered end having a socket for receiving an adjacent pipe and with a male end adapted to enter the shoulder or socket of an adjacent pipe, the socket being of sufficiently larger diameter than the male end of the pipe to permit the introduction of a suitable calking material within the socket and around the pipe for making a leak-tight joint between two lengths of pipe. This construction, while insuring tightness as long as the pipes are not deflected from their relative positions when the joint is calked has the disadvantage that the calking-joint is relied on to carry the strain of maintaining the relation between the pipes, and in case of any deflection of either pipe from its correct position, due to sagging or other cause, the joint is liable to yield and leakage may occur. In introducing branches for leading service or supply pipes from a buried main it is usual to dig through the earth at the point from which the branch is to be taken until the main is uncovered and then cut out enough of the main to enable the connection of a Y or T, which is usually done by slipping a sleeve carrying the desired branch and of much larger diameter than the main over the latter, sliding it across the break, and calking between the interior of the sleeve and the main at each end of the sleeve. This has necessitated some flexure of the main, has left the roughened ends of the main where cut out exposed as surfaces against which sediment could readily lodge, and has made calking difficult, because of the absence of any shoulder within the sleeve for checking the inward movement of the calking material. My invention aims to provide improvements in pipes or pipe-joints in which one pipe may be joined to another without requiring that the strain of preserving the pipes in alinement should be borne by the calking or packing material between them, and it aims to provide a slip-over joint which can be introduced into any pipe-length with the minimum of length cut out of the main, with the avoidance of abrupt shoulders at the joint for the collection of sediment, and with convenient means for calking.

To this end in carrying out one feature of my invention I construct the shoulder end of the pipe with two sockets, the outer one, of relatively large internal diameter, constituting a calking-socket and terminated by a shoulder against which the calking material may lodge and the inner one constituting a guiding-socket and of sufficiently smaller diameter to snugly fit the male end of a succeeding length of pipe, whereby the pipe lengths are alined by the inner socket, and the sole function of the outer socket is to make a tight joint, and in carrying out another feature of my invention I provide an improved slip-joint for repairing or service-branch purposes consisting of two telescopically-arranged members, the one corresponding at one end with the diameter of the main and having at its other end a calking-socket and preferably, also, my improved guiding-socket and adapted to slide in the other and the other having, if desired, a T or Y branch having at one end a calking-socket and preferably inwardly thereof a guiding-socket for engaging the cut end of a main and having at its other end a long chamber receiving the small end of the first member and a calking-socket at the end of such chamber, within which socket the joint between the main and telescopic members of the slip-joint may be calked. The main and telescopic members each have abrupt shoulders for fitting against the cut ends of the main and beveled shoulders at their adjacent engaging ends, and the calking-socket in the main member is preferably large enough to receive the enlargement surrounding the guiding-socket of the telescopic member. The main and sliding members of the slip-over joint may be collapsed and reduced to a minimum length sufficiently less than the length of the cut to be made from the main to permit movement of the slip-over joint into position between the cut ends of the main. Then the slip-over joint may be moved over one cut end until home thereon, whereupon by sliding one member of the joint outwardly until its socketed end is home on the other cut end of the main the joint will be formed ready for calking.

Figure 2:
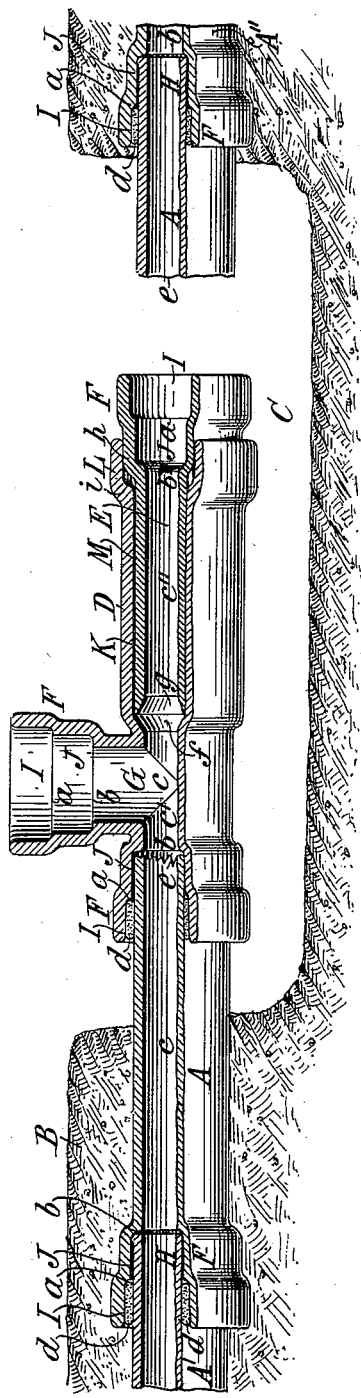

In the accompanying drawings, which show my improvements as applied to a street-main, Figure 1 is a side elevation, partly in axial section, of a cast-iron main having a branch joint constructed according to the preferred form of my invention; and Fig. 2 is a similar view showing the slip-over joint in process of being applied to the main.

Referring to the drawings, let A, A', and A'' indicate connected lengths of a water, gas, or other main; B, the earth in which the main is laid; C, a trench dug around the main for connecting the service or supply branch thereto or for repairing the main; D, one member of my improved slip-over joint; E, another member thereof; F, my improved pipe end, and G a branch socket on the member D.

According to one feature of improvement I form the female end F of a pipe with two sockets—an outer socket I, of relatively large diameter, and an inner socket J, of smaller diameter than the outer socket and of suitable diameter to fit the male end H of a similar pipe—and I provide a shoulder $a$ between the outer and inner sockets and a shoulder $b$ between the inner socket and the cylindrical interior $c$ of the pipe. The inner socket J serves as a guiding and holding socket and is of the same diameter as the normal exterior of its pipe and long enough to receive and engage the small end of an adjacent pipe, so that all tendency to lateral displacement of joined pipes will be resisted within this socket. The outer socket I is the calking-socket and is sufficiently larger than the normal outer diameter of the pipe to leave suitable room for the calking $d$, as shown, the shoulder $a$ constituting a positive surface against which the calking can be hammered to insure proper compacting for a tight joint and the shoulder $b$ at the end of the socket J constituting a surface against which the end H of the pipe can bear, so that there will be no opportunity for lodgment of obstructions at this point. In this way the weight and strains are made independent of the calking, tight calking can be obtained, and a concentric arrangement of the pipes is assured. This improved end may be formed on any suitable character of pipe and at any point where a male and female pipe joint is desired. It is shown in the drawings as applied to each length of piping, to the branch and to one end of the T formed on the member D, and to the female end of the member E of the slip-over joint.

According to another feature of improvement my invention provides a slip-over joint consisting, preferably, of two members telescopically engaging each other at their adjacent ends and adapted to embrace opposite ends of a main at their remote ends. The one member D, which is shown as provided with the branch G, preferably has my improved pipe end F, as above described, beyond which its internal diameter is preferably reduced to that of the pipe A, so that its shoulder $b$ may abut squarely against the cut end $e$ of this pipe, thus making a substantially flush joint at which there is little opportunity for the lodgment of obstructions. At its other end the member D telescopically engages the member E, so that the latter can slide axially of the main toward and from the member D. The member E is preferably constructed at its outer end with my improved pipe end F, the shoulder $b$ of which seats tightly against the cut end $e$ of the pipe A when the member E engages the latter, so that a substantially smooth internal surface is provided at the joint between the end of the main A and the member E, and there is small opportunity for lodgment of obstructions at this point. The engaging ends of the members D and E are preferably formed the one with a long guiding-socket K and with a calking-socket L and the other with a cylindrical exterior M, fitting within the socket K and sliding inwardly and outwardly thereof to contract or elongate the joint for bringing it between the pipe ends and engaging it therewith. The socket K is approximately of the same diameter as the cylindrical portion M and serves as a guiding-socket therefor, receiving the strains tending to laterally displace either member of the joint and preserving the two members in concentric relation. The inner end of the socket K is provided with a beveled shoulder $f$, connecting it with the interior $c'$ of normal diameter, and the adjacent end of the member E is internally beveled at $g$ to form a gradual descent from the small internal diameter $c''$ of the member to the larger interior of the socket K. This beveling of the faces $f$ and $g$ avoids abrupt shoulders at which obstructions might lodge. The calking-socket L is preferably large enough to receive the external wall $h$ of the guiding-socket J of the member E and has at its inner end a shoulder $i$, against which the calking material $d'$ may be compressed for insuring a tight joint. It is not essential that the calking-chamber L be made larger than the chambers I; but this is preferred, since it has the advantage of in such case receiving the wall $h$ of the member E, and thus increasing the contraction of the slip-over joint to the extent of the length of this wall, as shown in Fig. 2.

In connecting the main when provided with my improved pipe end one length of pipe will be slipped into the guiding-socket of another and then the calking will be done in the calking-socket, as heretofore. In making a slip-over joint either for repairing a leak or break in the pipe or for connecting a service branch thereto the pipe will be cut out for a distance equaling the length of the contracted slip-over joint plus the distance one of its ends is to pass over the adjacent cut end of the main. If the jointed member has both guiding and calking sockets, as shown, the length of main cut out will equal the length of the slip-over joint when collapsed plus the length of these two sockets, so that the slip-over joint can be passed freely between the cut ends of the main. Then the collapsed slip-over joint may be moved over either cut end of the main, whereupon its members may be separated telescopically a distance sufficient to cause the other end of the joint to engage the other cut end of the main. Then the calking between the cut ends of the main and the ends of the members D and E will be effected, after which the calking between the telescoping ends of these members will be done, whereupon a strong and leak-tight joint will be provided having a smooth interior for the flow through the main and the several lengths of which are guided and retained in position by positive contacts independent of the calkings, and the introduction of the slip-over joint can be effected without disturbing the alinement of either portion of the main.

Where either end of the main can be sufficiently flexed, the member E may be dispensed with, the member D being slid over the flexed end of the main, so that this end has passed into the socket K until the other end of the member D can be engaged with the adjacent end of the main, whereupon the member D can be slid off the end within its socket K sufficiently to engage its other end with the main, and then the calking can be done at each end of the member D, this operation being possible where the main consists of pipes so arranged that they can be slightly flexed, but where the joint is to be made without disturbing other joints in such pipes or without lengthening or shortening the pipes or resorting to screw-thread connections for the inserted joint.

The member D constitutes a new article of manufacture, the members D and E constitute an improved collapsible slip-over joint, and the improved end F constitutes a pipe end or hub adapted for application to any form of pipe.

It will be seen that my invention provides improvements which can be readily and advantageously availed of, and it will be underderstood that the invention is not limited to the particular details of construction, arrangement, or combination set forth as constituting its preferred form, since it can be employed in whole or in part, according to such constructions, arrangements, or combinations as circumstances or the judgment of those skilled in the art may dictate, without departing from the spirit of the invention.

What I claim is—

1. For pipe-joints and the like, the combination with a tubular member for fitting over the end of a pipe, having at one end a cylindrical internal chamber, and having a calking-socket of larger diameter at such end, and having at its other end a socket adapted to fit over the end of a pipe, of a tubular member adapted to fit within said chamber and having a socket at its outer end for engaging an adjacent pipe.

2. For pipe-joints, a slip-over joint consisting of two telescopically-engaging tubular members each having an engaged socket at its outer end to engage an adjacent end of piping, and means for making a tight joint between said members at their engaging ends.

3. For pipe-joints, a slip-over joint consisting of a tubular member having a branch pipe, and a second tubular member telescopically engaging and movable relatively to the first, said members each having engaged sockets at their extremities to engage adjacent ends of piping, and means for making a tight joint between said members.

4. In pipe-joints, a member D having a socket K at one end and adapted to engage an end of piping at its other end, and a member E sliding within said socket K at one end and having an engaging socket to engage a length of piping at its other end, said member D having a calking-socket L, whereby the joint between said members can be calked.

5. For pipe-joints, a member D having a shoulder $b$, socket J, shoulder $a$ and socket I at one end, and the socket K, shoulder $i$ and socket L at its other end, substantially as and for the purpose set forth.

6. For pipe-joints, a member D having a shoulder $a$ and socket I at one end, a socket K, shoulder $i$ and socket L at its other end, and a member E having an end M sliding in said socket K at one end, and having a shoulder $b$, socket J, shoulder $a$ and socket I at its other end, substantially as and for the purpose set forth.

7. In pipe-joints, a member D having a branch G between its ends, sockets J and I at one side of said branch, sockets K and L at the other side of said branch, and a shoulder $f$ at the end of said socket K, and a member E having an end M fitting slidingly in said socket K, a beveled end $g$ opposite said shoulder $f$, a shoulder $b$, socket J, shoulder $a$ and socket I at its other end, and a wall $h$ surrounding said socket J and sliding within said socket L.

In witness whereof I have hereunto signed my name in the presence of two subscribing witnesses.

WILLIAM KENNEALLY.

Witnesses:
 GEORGE H. FRASER,
 THOMAS F. WALLACE.